(12) United States Patent
Chen et al.

(10) Patent No.: US 12,249,148 B2
(45) Date of Patent: Mar. 11, 2025

(54) OBJECT-CENTRIC AND RELATION-CENTRIC GRAPH NEURAL NETWORKS FOR PHYSICAL PROPERTY DISCOVERY

(71) Applicant: INTERNATIONAL BUSINESS MACHINES CORPORATION, Armonk, NY (US)

(72) Inventors: Zhenfang Chen, Cambridge, MA (US); Chuang Gan, Cambridge, MA (US); Bo Wu, Cambridge, MA (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 17/656,296

(22) Filed: Mar. 24, 2022

(65) Prior Publication Data

US 2023/0306738 A1 Sep. 28, 2023

(51) Int. Cl.
| | |
|---|---|
| *G06V 20/40* | (2022.01) |
| *G06T 7/20* | (2017.01) |
| *G06V 10/62* | (2022.01) |
| *G06V 10/82* | (2022.01) |
| *G06V 20/50* | (2022.01) |

(52) U.S. Cl.
CPC ........... *G06V 20/46* (2022.01); *G06T 7/20* (2013.01); *G06V 10/62* (2022.01); *G06V 10/82* (2022.01); *G06V 20/50* (2022.01); *G06T 2207/10016* (2013.01); *G06T 2207/20084* (2013.01); *G06T 2207/30241* (2013.01)

(58) Field of Classification Search
CPC ........ G06V 20/46; G06V 10/82; G06V 10/62; G06V 20/50; G06T 7/20; G06T 2207/10016; G06T 2207/20084; G06T 2207/30241
See application file for complete search history.

(56) References Cited

U.S. PATENT DOCUMENTS

| | | | | |
|---|---|---|---|---|
| 2019/0347526 | A1* | 11/2019 | Sunkavalli | G06N 3/084 |
| 2020/0327378 | A1* | 10/2020 | Smith | G06N 5/048 |
| 2021/0049467 | A1 | 2/2021 | Riedmiller | |
| 2021/0142097 | A1* | 5/2021 | Zheng | G06V 10/761 |

(Continued)

OTHER PUBLICATIONS

Battaglia, et al., "Interaction Networks for Learning about Objects, Relations and Physics," NIPS 2016, Dec. 1, 2016, 12 pages, arXiv:1612.00222v1, Retrieved from the Internet: <URL: https://arxiv.org/abs/1612.00222>.

(Continued)

*Primary Examiner* — Syed Haider
(74) *Attorney, Agent, or Firm* — CANTOR COLBURN LLP; Robert D. Bean (57) ABSTRACT

According to one embodiment, a method, computer system, and computer program product for identifying one or more intrinsic physical properties of one or more objects is provided. The present invention may include identifying one or more objects in a video set, extracting observable physical properties of the identified one or more objects from the video set, including one or more trajectories, and inferring, by a property-based graph neural network, intrinsic properties of the one or more objects based on the trajectories.

15 Claims, 7 Drawing Sheets

(56) References Cited

U.S. PATENT DOCUMENTS

2021/0383115 A1* 12/2021 Alon ............... B25J 9/1602

OTHER PUBLICATIONS

Chang, et al., "A Compositional Object-Based Approach to Learning Physical Dynamics," ICLR [conference paper], 2017, 15 pages, Mar. 4, 2017, 15 pages, arXiv:1612.00341 [cs.AI], Retrieved from the Internet: <URL: https://arxiv.org/abs/1612.00341>.

Chen, et al., "Comphy: Compositional Physical Reasoning of Objects and Events From Videos," CLR 2022 Conference [conference paper], Sep. 28, 2021 [accessed on Jan. 25, 2022], 19 pages, Retrieved from the Internet: <URL: https://openreview.net/forum?id=PgNEYalc81Q>.

Ding, et al., "Dynamic Visual Reasoning by Learning Differentiable Physics Models from Video and Language," 35th Conference on Neural Information Processing Systems (NeurIPS 2021), 2021, 14 pages, Retrieved from the Internet: <URL: https://arxiv.org/abs/2110.15358>.

Kipf, et al., "Neural Relational Inference for Interacting Systems," ICML 2018, Jun. 6, 2018, 17 pages, arXiv:1802.04687v2, Retrieved from the Internet: <URL: https://arxiv.org/abs/1612.00222>.

Li, et al., "Learning Compositional Koopman Operators for Model-Based Control," ICLR 2020 Conference Blind Submission, Apr. 27, 2020, 14 pages, Retrieved from the Internet: <https://openreview.net/pdf?id=H1ldzA4tPr>.

Li, et al., "Propagation Networks for Model-Based Control Under Partial Observation," ICRA 2019 [MIT project], [accessed on Jan. 31, 2021], 8 pages, Retrieved from the Internet: <URL: http://propnet.csail.mit.edu/propnet-paper.pdf>.

Li, et al., "Visual Grounding of Learned Physical Models," ICML 2020 [project paper], Jun. 29, 2020, 10 pages, arXiv:2004.13664v2, Retrieved from the Internet: <URL: https://arxiv.org/abs/2004.13664>.

Mell, et al., "The NIST Definition of Cloud Computing", National Institute of Standards and Technology, Special Publication 800-145, Sep. 2011, 7 pages.

Sanchez-Gonzalez, et al., "Graph Networks as Learnable Physics Engines for Inference and Control," 35th International Conference on Machine Learning [proceedings], 2018, 10 pages, vol. 80, PMLR, Stockholm, SE, Retrieved from the Internet: <URL: http://proceedings.mlr.press/v80/sanchez-gonzalez18a.html>.

Zheng, et al., "Unsupervised Learning of Latent Physical Properties Using Perception-Prediction Networks," Jul. 25, 2018, 11 pages, arXiv:1807.09244 [cs.LG], Retrieved from the Internet: <URL: https://arxiv.org/abs/1807.09244>.

* cited by examiner

OBJECT-CENTRIC AND RELATION-CENTRIC GRAPH NEURAL NETWORKS FOR PHYSICAL PROPERTY DISCOVERY

BACKGROUND

The present invention relates, generally, to the field of computing, and more particularly to computer vision.

Computer vision is a field concerned with equipping computers with the means to approximate the functionality of the human visual system. In practice, this entails utilizing computers to extract meaningful information from digital images, a task that, while easy for humans, is extraordinarily difficult for computers. Extracting meaningful information from an image may entail transforming the visual images into descriptions of the world that can interface with other cognitive processes so as to produce appropriate reactions. This image understanding can be seen as the disentangling of symbolic information from image data using models constructed with the aid of geometry, statistics, and learning theory. While many approaches to the task have been implemented over the past few decades, there remains a long way to go before digital image recognition begins to approach the speed and accuracy of a human being.

SUMMARY

According to one embodiment, a method, computer system, and computer program product for identifying one or more intrinsic physical properties of one or more objects is provided. The present invention may include identifying one or more objects in a video set, extracting observable physical properties of the identified one or more objects from the video set, including one or more trajectories, and inferring, by a property-based graph neural network, intrinsic properties of the one or more objects based on the trajectories.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to computer vision. The following described exemplary embodiments provide a system, method, and program product to, among other things, infer intrinsic physical properties of one or more objects from video using a physical property graph neural network. Therefore, the present embodiment has the capacity to improve the technical field of computer vision by enabling computers to identify non-observable intrinsic physical properties of objects and operate devices to interact with the objects based on the identified intrinsic physical properties. The embodiment may further improve the technical field of computer vision by providing a method that reduces the resource cost, speed and efficiency of physical property discovery by leveraging the object-centric and relationship inductive biases and efficiencies of graph neural networks to infer the intrinsic physical properties; the graph neural network is a more accurate method of inferring object's intrinsic properties compared with fully-connected layers and LSTMs. Furthermore, graph neural networks may offer improved flexibility over differential physics engines in inferring objects' intrinsic properties, for at least the reason that differential physics engines require the prior of explicit physical laws to build the inference model while graph neural network-based models have no such constraints. Embodiments may further improve the technical field of robotics by enabling navigation and operation of autonomous devices based on the intrinsic properties of objects, which may enable autonomous devices to, for example, more accurately calculate how much force to use in picking up or handling objects or whether obstacles in a route can be pushed aside.

As previously described, computer vision is a field concerned with equipping computers with the means to approximate the functionality of the human visual system. In practice, this entails utilizing computers to extract meaningful information from digital images, a task that, while easy for humans, is extraordinarily difficult for computers. Extracting meaningful information from an image may entail transforming the visual images into descriptions of the world that can interface with other cognitive processes so as to produce appropriate reactions. This image understanding can be seen as the disentangling of symbolic information from image data using models constructed with the aid of geometry, statistics, and learning theory. While many approaches to the task have been implemented over the past few decades, there remains a long way to go before digital image recognition begins to approach the speed and accuracy of a human being.

Objects in nature often exhibit complex properties that define how they interact with the physical world. To humans, the unraveling of new intrinsic physical properties often
} marks important milestones towards a deeper and more accurate understanding of nature. Objects' motions in nature are governed by complex interactions and their properties. While some properties, such as shape and material, can be identified via the object's visual appearances, others like mass and electric charge are not directly visible. The compositionality between the visible and hidden properties poses unique challenges for AI models to reason from the physical world, whereas humans can effortlessly infer them with limited observations. For this reason, it is non-trivial to build a benchmark for compositional physical reasoning; existing studies on video reasoning mainly focus on visually observable elements such as object appearance, movement, and contact interaction, resulting in a failure to identify the accuracy of models attempting to detect these hidden properties. Existing benchmarks assume that there is no variance in objects' physical properties and ask models to learn physical reasoning from massive videos and question-answer pairs. A straightforward solution may be to correlate object appearance with physical properties, for instance considering all red spheres to be heavy, and then asking questions about their dynamics. However, such a design is imperfect because it cannot evaluate whether a model understands the physical properties or is memorizing the visual appearance prior. Even despite this deficiency in testing the performance of current models, it is clear that current models are not equipped to accurately assess intrinsic qualities of objects. Models that determine appearance concepts like color and collision that can be perceived in even a single frame may be incapable of detecting intrinsic physical properties, such as mass and charge, which cannot be directly captured from objects' static appearance, and therefore cannot be inferred from a single image. As such, it may be advantageous to implement a modularized model that can infer objects' physical properties and predict the objects' movements. It may be further advantageous to implement a model that can combine objects' trajectories from different video slots for better physical property prediction and learn object-centric physical properties such as mass, and relation-centric physical properties, such as charge, simultaneously.

According to one embodiment, the invention may be a method of utilizing a physical property-based graph neural network (PPGNN) to identify objects' physical properties from the objects' trajectories and interactions in different video slots.

The PPGNN may be a machine-learning method designed to perform inference on data described by graphs and may comprise a perception module and a physical property learning (PPL) module.

Objects may herein refer to any physical body that can be seen and touched. Objects may possess physical properties, which may be any characteristic of the object that can be observed and measured. Physical properties may further comprise observable physical properties, or observable properties, and intrinsic physical properties, or intrinsic properties; observable properties may be any physical properties of an object which may be visually observed, such as color, movement, contact interaction, size, shape, material, et cetera. Observable properties may further be divided into static attributes and dynamic attributes, where static attributes may be observable characteristics of the object that remain constant irrespective of movement, such as color and size, and wherein dynamic attributes may be observable characteristics of the object that change responsive to motion, such as position, location, movement, vector, et cetera. Intrinsic properties are physical properties of an object that are not directly reflected in the object's visual appearances or otherwise detectable without imposing an interaction, such as mass, charge, bounciness coefficients, friction, et cetera. Moreover, intrinsic properties affect object motion in a compositional fashion. In some embodiments of the invention, the system may designate one or more objects as "target objects," which may be objects that the system wants to determine the intrinsic properties of. For example, a red ball that a robot arm is being programmed to pick up may be designated as a target object, as the robot arm needs to know the mass and bounciness of the ball to determine the force and speed with which to pick up the ball. The target objects may be pre-identified by a human user, software program, et cetera and provided to the system.

In some embodiments of the invention, the system may receive reference videos and/or target videos as inputs. Reference videos may be videos comprising objects that are provided to the system for training purposes, to provide test cases from which the system may learn intrinsic properties of the objects. The target videos may be videos comprising a number of objects for which the system must determine the intrinsic properties of at least one or more of the objects. Any group of two or more videos which shares objects in common that possess the same intrinsic properties may be referred to as a video set. The video set may comprise any number or combination of target videos and reference videos. The video set may comprise a single contiguous video recorded by a single camera that has been separated into segments, may be multiple videos recorded by multiple cameras at the same time, multiple videos recorded by multiple cameras at different times, et cetera. In some embodiments of the invention, the target videos may be received in real-time or near-real-time from cameras. Both reference videos and target videos may be raw video, which may make the system better suited for adaptation to real-world applications, although the reference videos and target videos may also or alternatively be sanitized, modified, or otherwise manipulated to provide improved training value for the model.

In some embodiments of the invention, for example where the target videos may be received in real-time or near-real-time from cameras, and/or for example where the system may operate or be in communication with a controllable moveable device such as a robotic arm, wheeled drone, et cetera, and/or for example where one or more target objects in a video or video set are stationary, the system may control the device to cause an interaction with one or more target objects while capturing the interaction with a camera. For example, the system may control a robotic arm to bump gently into a ball to cause it to move. Because intrinsic attributes of an object may not be detectable if the video or video set does not capture an interaction between that object and another object, the system may have to impose an interaction to determine the intrinsic attributes of the object.

The perception module may detect objects' location and observable properties in the target video. The perception module may detect and recognize some or all objects at every or several video frames within the target video. In some embodiments, the perception module may detect one or more target objects and/or all objects the one or more target objects interact with in some or all frames within the target video. The perception module may extract observable properties from the objects such as color, shape and material. The perception module may output the static attributes of all objects as well as their trajectories during the video. In some embodiments of the invention, the perception module may apply a Mask RCNN convolutional neural network in detecting objects in the target video.

In some embodiments of the invention, for example where the perception module is provided a video set, the perception module may apply processing to the videos comprising the video set to align and connect the common objects within the videos. In some embodiments of the invention, for example where the video is part of a video set, the system may identify common objects within each video of the video set based on the observable properties of the objects.

The physical property learning (PPL) module may infer objects' intrinsic properties based on detected object trajectories. Given at least the objects' trajectories from the perception module, the PPL module may infer the mass and relative charge between each object pair in the video where the object pairs interact. In some embodiments of the invention, the PPL module may be implemented using a graph neural network where the node features contain object-centric properties (such as mass) and edge features encode pairwise properties (such as relative charge). By estimating edge relations between object nodes, the system enables detection of pair-wise properties such as charges, attraction and repulsion. Because the system may be invariant under charge inversion, the charge property may be described by the relative signs between each object pair, even though the charge carried by each individual object should be easy to recover given the pairwise relation plus the true sign of one object.

In some embodiments of the invention, for example where the system is inferring the object properties of objects in a video set, the full physical properties of all the objects of a video set can be represented as a fully connected property graph. Each node may represent an object that appears in at least one of the videos from the set, and each edge may represent that the two nodes the edge connects carry the same, opposite, or no relative charge (that is, one or both objects are charge-neutral). For each video of the video set, the PPL module may only infer the properties of the objects it covers, revealing only parts of the property graph. The full object properties are obtained by combining all the subgraphs generated by each video from the set via max-pooling over node and edge. By aggregating the inferred intrinsic properties of common objects of the different videos of a set, system may cross-reference the inferred intrinsic properties and identify outliers and improve consistency, thereby improving the accuracy of the inferences.

In some embodiments of the invention, the system may recognize an object within a first video as possessing observable or intrinsic properties that match with those of an object within a second video or a video set. The system may create a video set comprising the first video and the second video and add the first video to the video set, respectively. If the first video belongs to a video set, the system may add the second video or combine the two video sets into one.

In some embodiments of the invention, the system may operate a device based on the learned intrinsic properties of the objects. The system may operate a device by, for example, planning a route for an autonomous vehicle to travel based on determining that obstacles on the floor are light relative to the autonomous vehicle and can be pushed aside, operate a robotic arm to pick up, move, throw, or drop and object based on the mass of the object, plan the gait of a legged vehicle based on determining the bounciness of the ground, manipulate particles in lab equipment based on determining the relative charges of the particles, et cetera.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to infer intrinsic physical properties of one or more objects from video using a physical property graph neural network.

Figure 1:
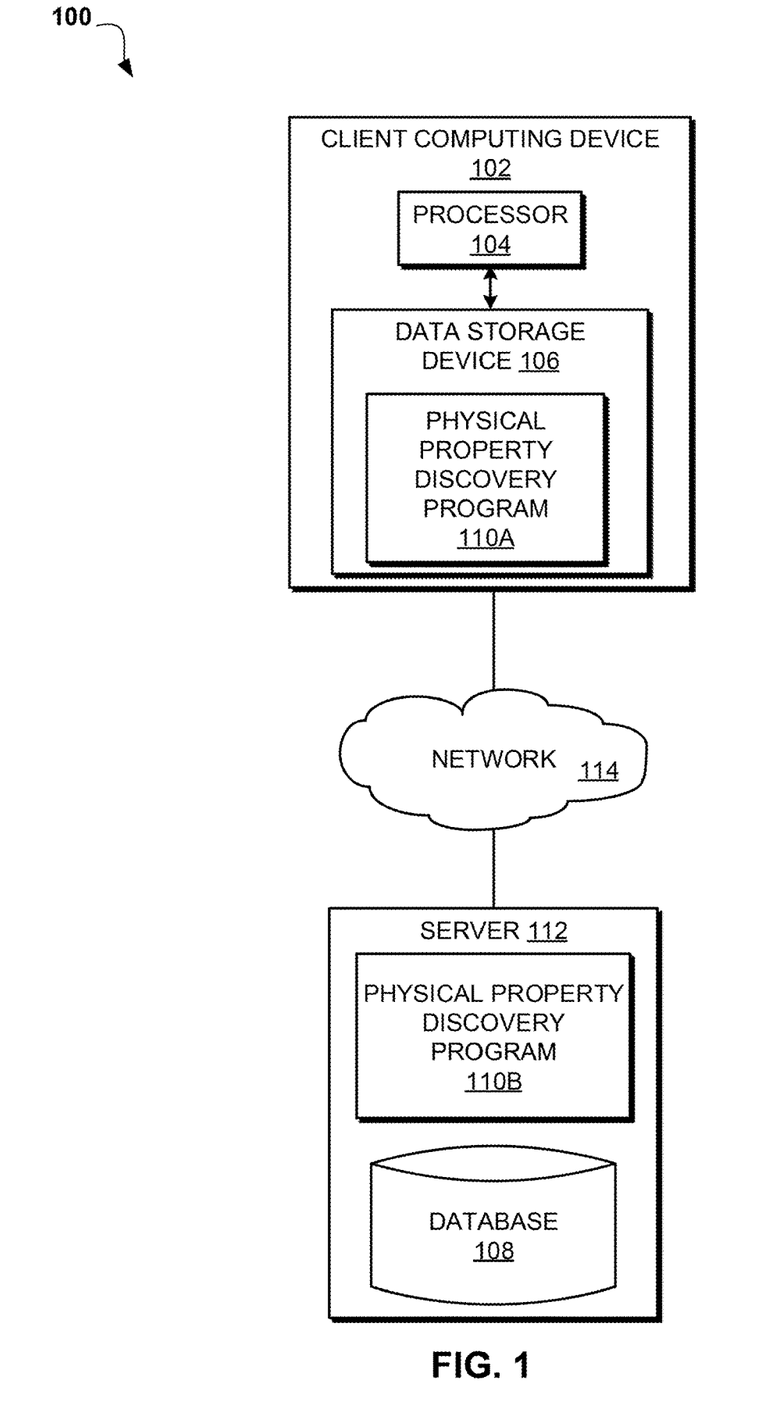
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a physical property discovery program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a physical property discovery program 110B and a database 108 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the physical property discovery program 110A, 110B may be a program enabled to infer intrinsic physical properties of one or more objects from video using a physical property graph neural network. The physical property discovery program 110A, 110B may be located on client computing device 102 or server 112 or on any other device located within network 114. Furthermore, physical property discovery program 110A, 110B may be distributed in its operation over multiple devices, such as client computing device 102 and server 112. The physical property discovery method is explained in further detail below with respect to FIG. 2.

Figure 2:
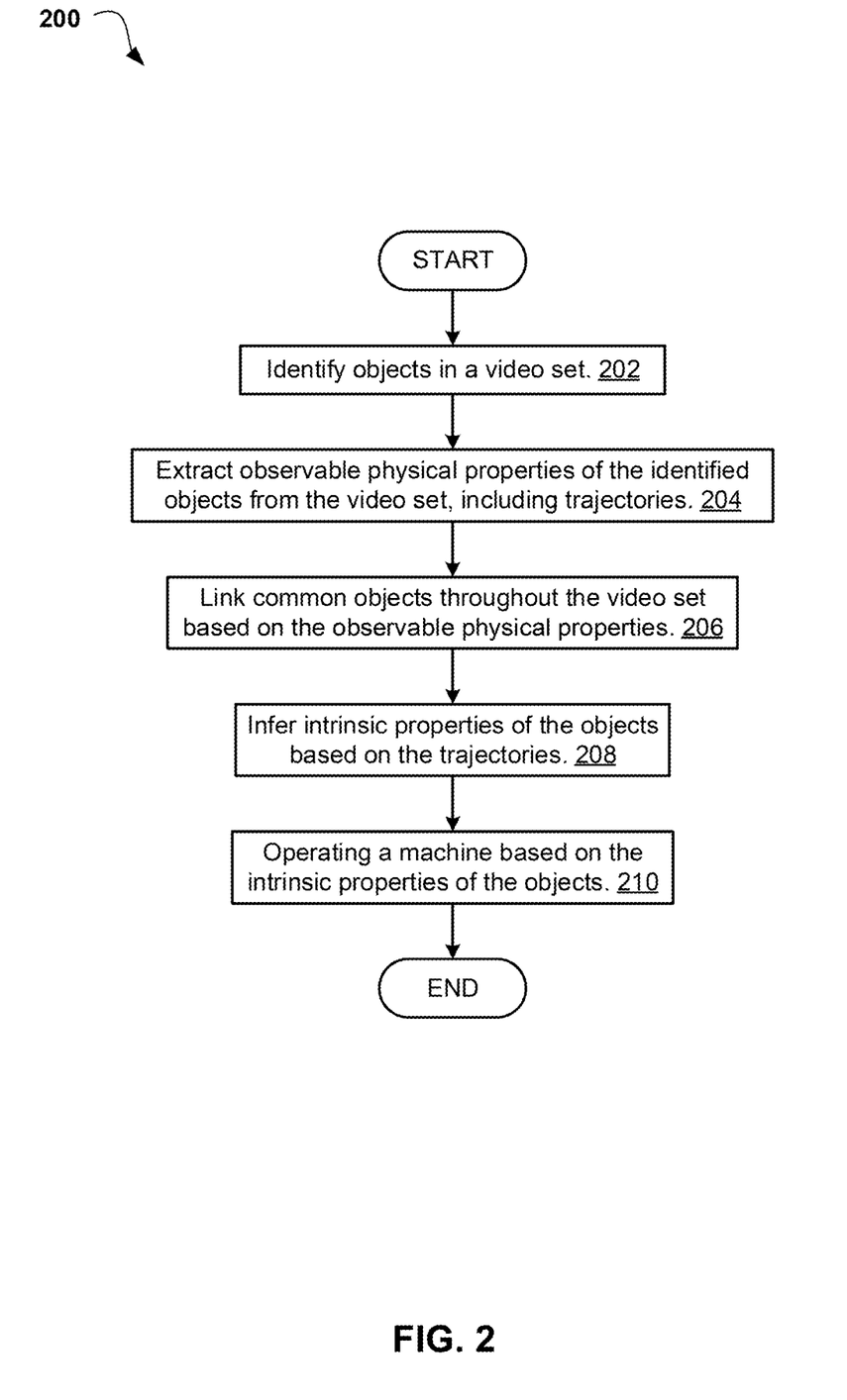
FIG. 2 is an operational flowchart illustrating a physical property discovery process according to at least one embodiment.

Referring now to FIG. 2, an operational flowchart illustrating a physical property discovery process 200 is depicted according to at least one embodiment. At 202, the physical property discovery program 110A, 110B identifies objects in a video set. The physical property discovery program 110A, 110B may employ machine learning object detection techniques such as fully convolutional networks or faster regionbased convolutional neural networks to scan regions of the videos of the video sets for objects that match pre-defined object classes in a database. In some embodiments of the invention, the physical property discovery program 110A, 110B may identify only target objects in the videos of the video set; the target objects may be pre-supplied to the physical property discovery program 110A, 110B. In some embodiments, the physical property discovery program 110A, 110B may use object detection to identify all objects near the target object and/or all objects which the target object has interacted with, for example based on the trajectory of the target object. In some embodiments of the invention, property discovery program 110A, 110B may record the videos and/or the video set itself with connected cameras or receive them from cameras attached to or in communication with the system.

At 204, the physical property discovery program 110A, 110B extracts observable physical properties of the identified objects from the videos of the video set, including trajectories. The physical property discovery program 110A, 110B may use machine vision techniques to extract the static attributes of the identified objects, such as color, size, shape, et cetera. The physical property discovery program 110A, 110B may extrapolate the dynamic attributes of the identified objects by locating the identified objects in successive frames to create a time series of the position of the identified objects, from which the physical property discovery program 110A, 110B may extrapolate a trajectory of the identified objects.

At 206, the physical property discovery program 110A, 110B links common objects throughout the video set based on the observable physical properties. In some embodiments of the invention, for example where the physical property discovery program 110A, 110B is provided a video set, the physical property discovery program 110A, 110B may apply processing to the videos comprising the video set to identify a number of objects that appear in multiple videos of the video set; the physical property discovery program 110A, 110B may do so by comparing the static attributes of identified objects in any given video of the video set against the static attributes of objects in all other videos of the set, and where the static attributes match, identifying the matching objects as common objects. The physical property discovery program 110A, 110B may consider all common objects to be the same object shown in different videos of the set and may assume common objects to share the same intrinsic properties, such that where a common object's intrinsic properties are identified in one video of the video set, those identified intrinsic properties can be considered to hold true for the common object in all other videos of the video set. For example, if a blue cube appears in multiple videos of a video set and only interacts with another object in a single video, the physical property discovery program 110A, 110B may infer the intrinsic properties of the blue cube in the video comprising the interaction and apply those intrinsic properties to the blue cube via metadata, and thereby identify the intrinsic properties of the blue cube in every other video where the blue cube appears.

At 208, the physical property discovery program 110A, 110B infers intrinsic properties of the objects based on the trajectories. The physical property discovery program 110A, 110B may infer objects' intrinsic properties based on detected object trajectories. Given at least the objects' trajectories, the physical property discovery program 110A, 110B may infer the mass and relative charge between each object pair in the video where the object pairs interact. In some embodiments of the invention, the physical property discovery program 110A, 110B may be implemented using a graph neural network where the node features contain object-centric properties (such as mass) and edge features encode pairwise properties (such as relative charge). By estimating edge relations between object nodes, the physical property discovery program 110A, 110B enables detection of pair-wise properties such as charges, attraction and repulsion. Because the physical property discovery program 110A, 110B may be invariant under charge inversion, the charge property may be described by the relative signs between each object pair, even though the charge carried by each individual object should be easy to recover given the pairwise relation plus the true sign of one object. Where the physical property discovery program 110A, 110B infers intrinsic properties of a common object in a video of a video set, the physical property discovery program 110A, 110B may tag all instances of the common object occurring in other videos of the video set as sharing the inferred intrinsic properties.

At 210, the physical property discovery program 110A, 110B operates a machine based on the intrinsic properties of the objects. The physical property discovery program 110A, 110B may operate a device based on the learned intrinsic properties of the objects. The physical property discovery program 110A, 110B may operate a device by, for example, planning a route for an autonomous vehicle to travel based on determining that obstacles on the floor are light relative to the autonomous vehicle and can be pushed aside, operate a robotic arm to pick up, move, throw, or drop and object based on the mass, bounciness, and/or friction of the object, plan the gait of a legged vehicle based on determining the bounciness and/or friction of the ground surface, manipulate particles in lab equipment based on determining the relative charges of the particles, et cetera.

Figure 3:
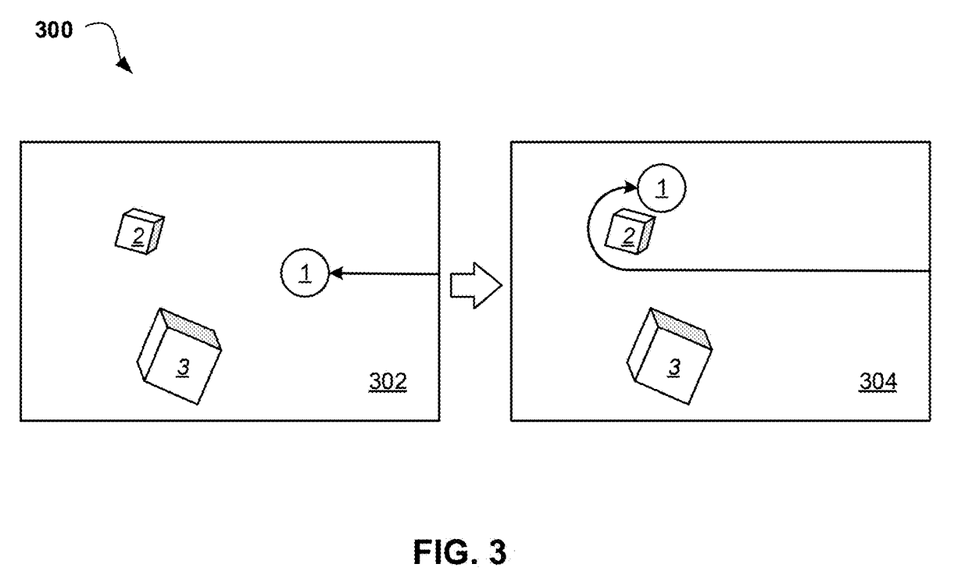
FIG. 3 is a diagram illustrating an exemplary interaction between objects with different intrinsic physical properties.

Referring now to FIG. 3, a diagram illustrating an exemplary target video 300 depicting an exemplary interaction between objects with different intrinsic physical properties is depicted, according to at least one embodiment. As shown here and with respect to FIG. 4 below, different intrinsic physical properties such as charge often lead to drastically different future evolutions. Objects carrying the same or opposite charge will exert a repulsive or attractive force on each other. The resulting motion not only depends on the amount of charge each object carries, but also their signs. The inertia determines how sensitive an object's motion is to external forces. When a massive object interacts with a light object via attraction, repulsion, or collision, the lighter object will undergo larger changes in its motion compared with the massive object's trajectory. Here, in a first frame 302 of exemplary target video 300, object 1 is traveling towards stationary objects 2 and 3. In a second frame 304 of exemplary target video 300, object 1's trajectory has changed as it is attracted towards object 2. Based on the attraction between object 1 and object 2 evidenced by the trajectory of object 1 with respect to object 2, the physical property discovery program 110A, 110B may infer that object 1 and object 2 have the same charge. The physical property discovery program 110A, 110B may further infer the mass of object 1 relative to object 2, as mass determines how much an object's trajectory is perturbed during an interaction; heavier objects have more stable motion. The physical property discovery program 110A, 110B may infer that object 2 is much heavier than object 1, because object 1 was pulled into a new trajectory while object 2 remained more or less stationary.

Figure 4:
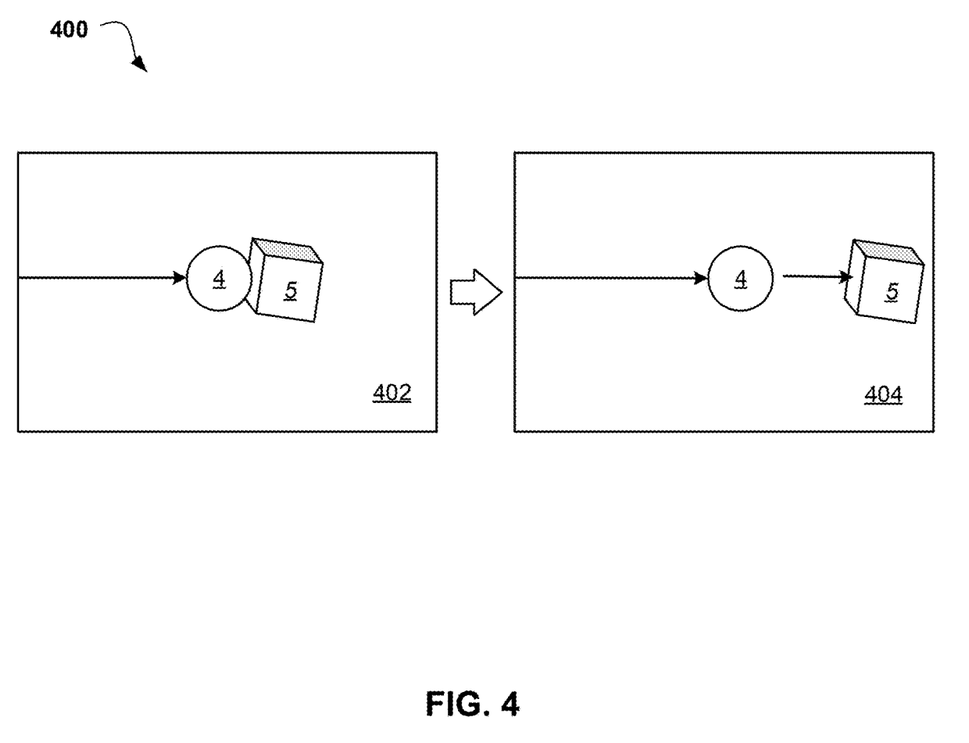
FIG. 4 is a diagram illustrating an exemplary interaction between objects with different intrinsic physical properties.

Referring now to FIG. 4, a diagram illustrating an exemplary target video 400 depicting an exemplary interaction between objects with different intrinsic physical properties is depicted, according to at least one embodiment. Here, in a first frame 402 of exemplary target video 400, an object 4 travels rapidly towards a stationary object 5. In a second frame 404 of exemplary target video 400, which was recorded chronologically after first frame 402, object 4 has collided with object 5, slowing the motion of object 4 and imparting motion to object 5. The physical property discovery program 110A, 110B may infer the mass of object 4 relative to object 5, for example concluding that object 4 is heavier than object 5.

Figure 5:
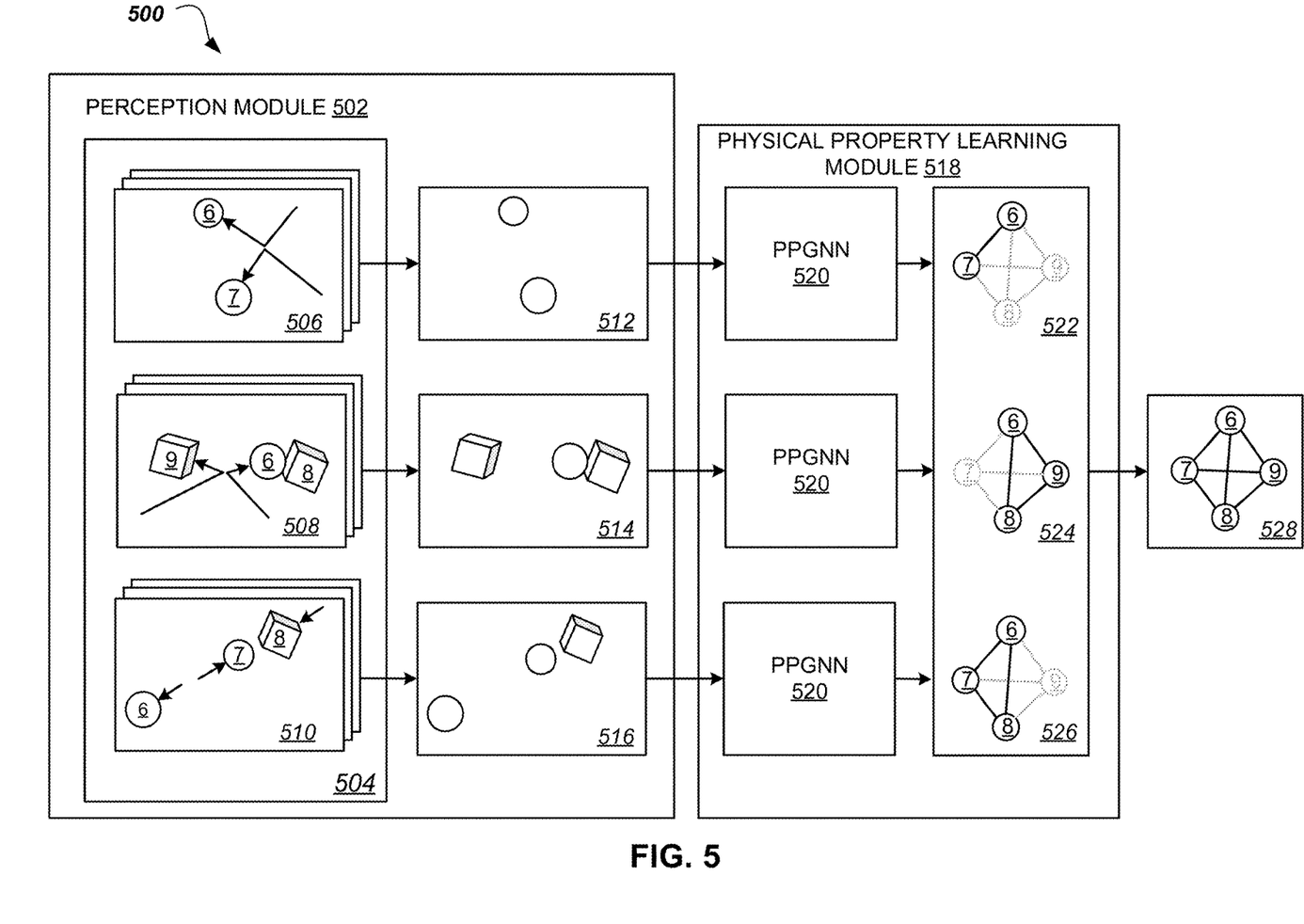
FIG. 5 is an operational flowchart illustrating an exemplary physical property discovery system according to at least one embodiment.

Referring now to FIG. 5, an operational flowchart illustrating an exemplary physical property discovery system 500 is depicted, according to at least one embodiment. Here, the perception module 520 receives a set 504 of videos comprising reference video 506, reference video 508, and target video 510. Reference video 506 depicts object 6 and object 7 colliding and rebounding from each other in different directions. Reference video 508 depicts object 6 colliding with object 9 and redirecting into a collision course with object 8. Target video 510 depicts an object 6 moving away from object 7, and object 7 and object 8 are moving towards each other on a collision course. The perception module 502 may identify the trajectories of objects 6 and 7 in reference video 506 and isolate the static attributes such as shapes, colors, and location as illustrated in frame 512, may identify the trajectories of objects 6, 8 and 9 in reference video 508 and isolate the static attributes as in frame 514, and may identify the trajectories of objects 6, 7, and 8 in target video 510 and isolate the static attributes of those objects as in frame 516. The physical property discovery program 110A, 110B may pass the trajectories and static attributes to the physical property-based graph neural network (PPGNN) 520 in the physical property learning module 518 to infer the intrinsic physical properties of the videos 504 based on the trajectories and the static attributes. The PPGNN may represent objects 6 and 7 of reference video 506 as nodes in graph 522, with the edge connecting the two nodes represents if the two nodes carry the same, opposite, or no relative charge. The PPGNN may likewise represent objects 6, 8 and 9 of reference video 508 as nodes in graph 524, and may represent objects 6, 7 and 8 of target video 510 as nodes in graph 526. The physical property discovery program 110A, 110B may aggregate graphs 522, 524, and 526 into a combined graph 528, which represents all four objects 6, 7, 8, and 9 as nodes, and the pairwise properties as edges between the nodes.

It may be appreciated that FIGS. 2-5 provide only illustrations of individual implementations and do not imply any limitations with regard to how different embodiments may be implemented. Many modifications to the depicted environments may be made based on design and implementation requirements.

Figure 6:
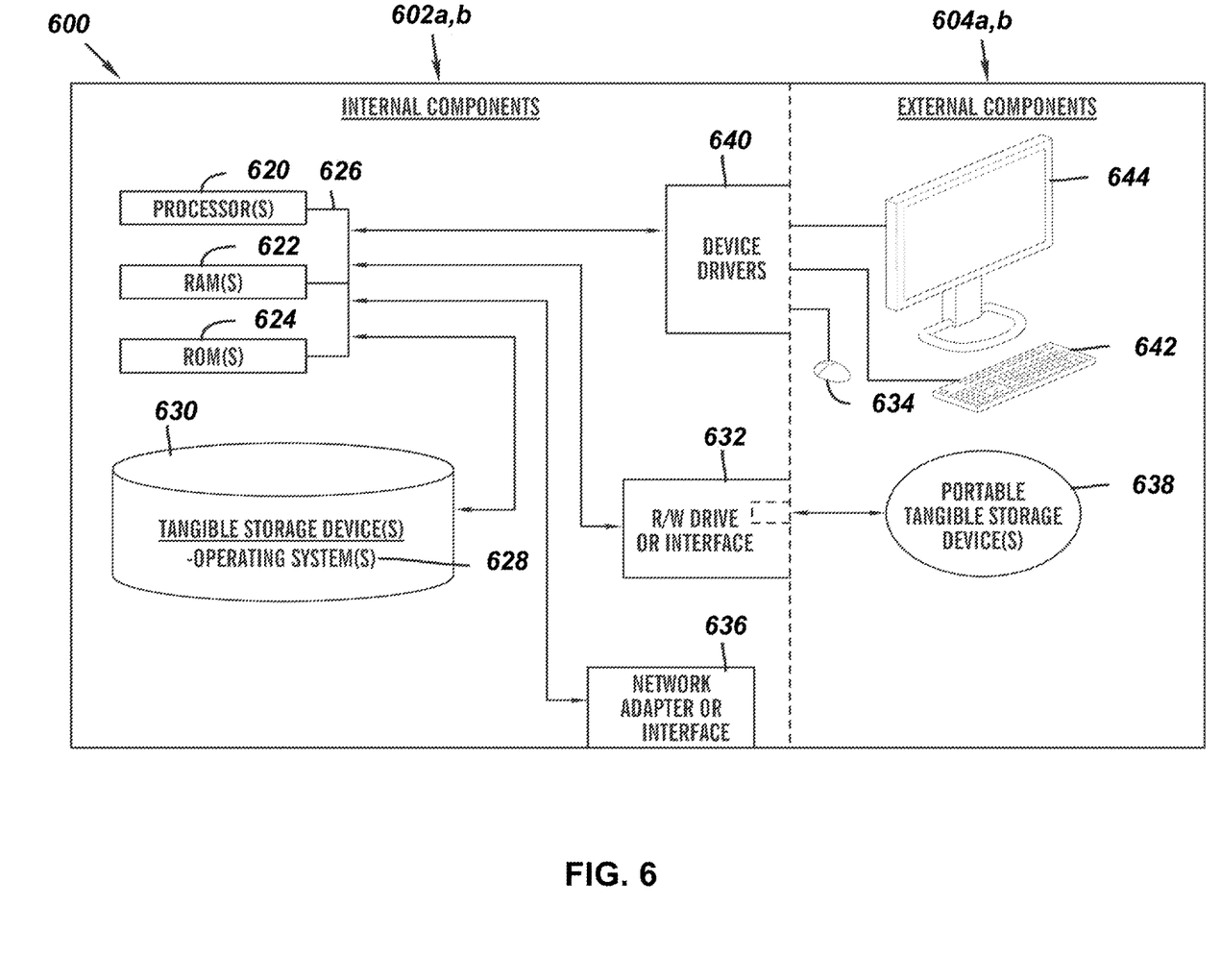
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602a,b and external components 604a,b illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628 and the physical property discovery program 110A in the client computing device 102, and the physical property discovery program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the physical property discovery program 110A, 110B, can be stored on one or more of the respective portable computer-readable tangible storage devices 638, read via the respective R/W drive or interface 632, and loaded into the respective hard drive 630.

Each set of internal components 602a,b also includes network adapters or interfaces 636 such as a TCP/IP adapter cards, wireless Wi-Fi interface cards, or 3G or 4G wireless interface cards or other wired or wireless communication links. The physical property discovery program 110A in the client computing device 102 and the physical property discovery program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the physical property discovery program 110A in the client computing device 102 and the physical property discovery program 110B in the server 112 are loaded into the respective hard drive 630. The network may comprise copper wires, optical fibers, wireless transmission, routers, firewalls, switches, gateway computers and/or edge servers.

Each of the sets of external components 604a,b can include a computer display monitor 644, a keyboard 642, and a computer mouse 634. External components 604a,b can also include touch screens, virtual keyboards, touch pads, pointing devices, and other human interface devices. Each of the sets of internal components 602a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
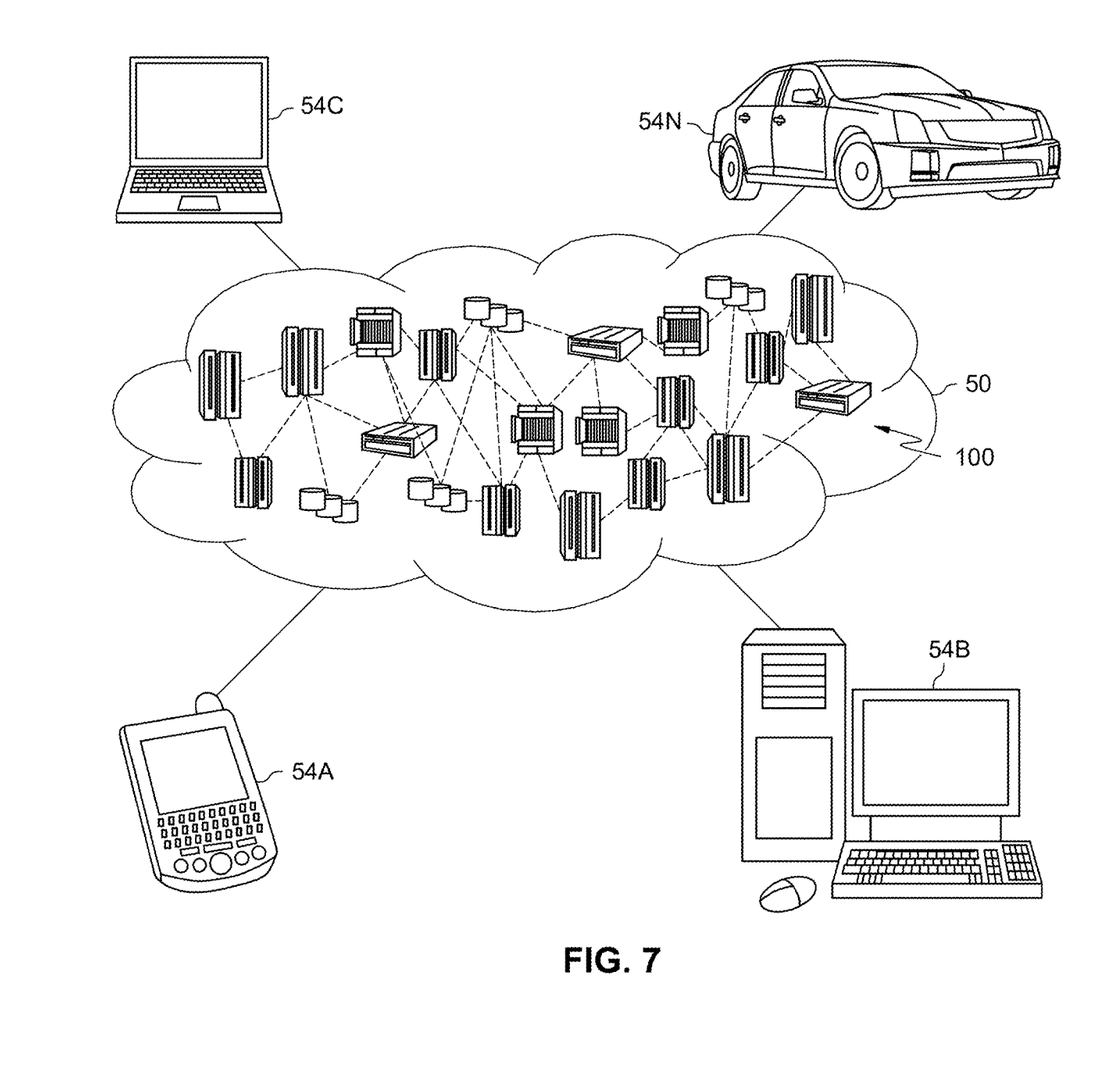
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
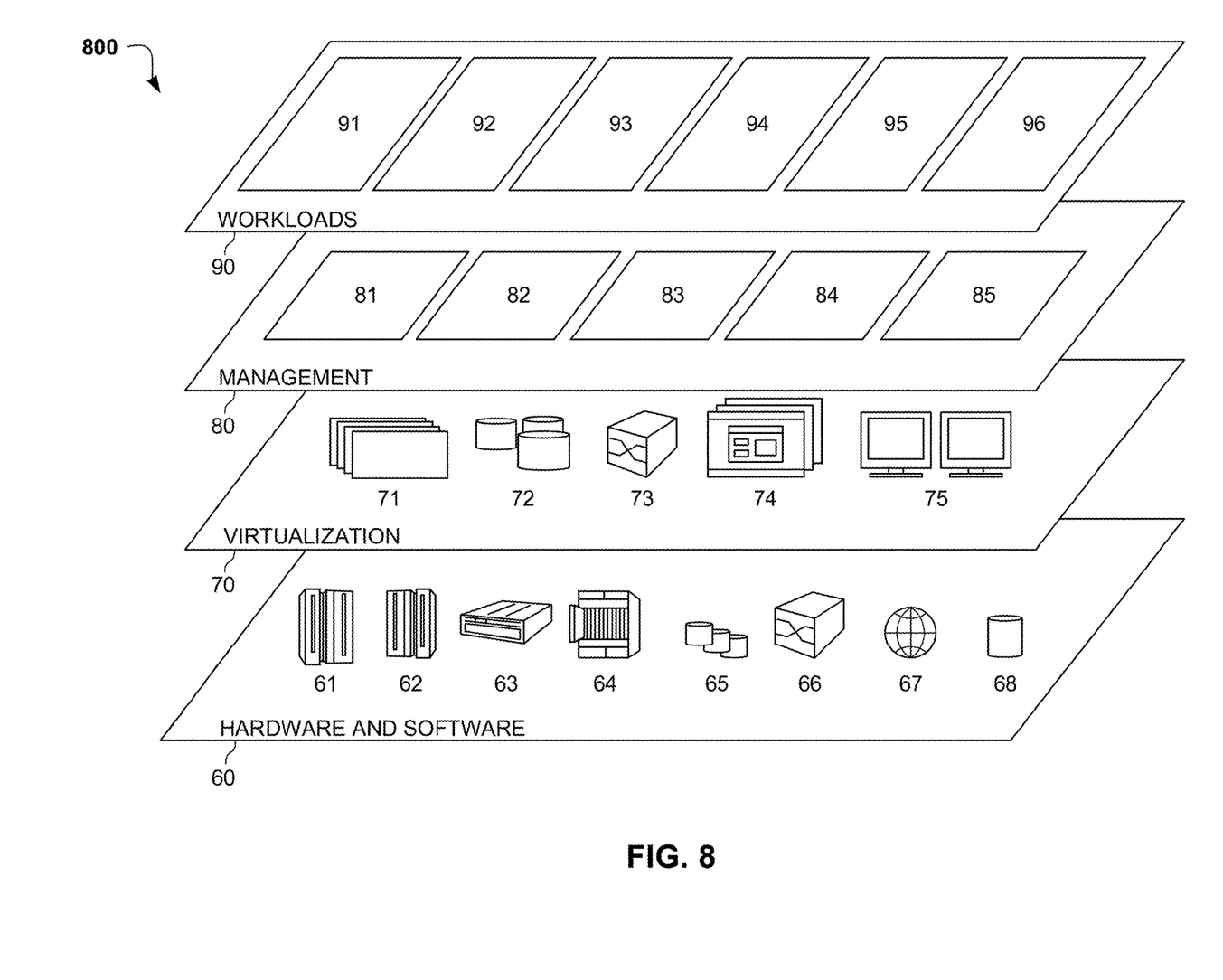
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and physical property discovery 96. The physical property discovery 96 may be enabled to infer intrinsic physical properties of one or more objects from video using a physical property graph neural network.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for identifying one or more intrinsic physical properties of one or more objects, the method comprising:
   identifying one or more objects in a video set;
   extracting observable physical properties of the identified one or more objects from the video set, including one or more static properties and one or more dynamic properties;
   inferring, by a property-based graph neural network, intrinsic properties of the one or more objects based on the one or more dynamic properties;
   representing the intrinsic properties of all identified objects in the video set as a graph comprising nodes and edges, wherein each node represents an identified object of the one or more identified objects and each edge represents a charge between two connected objects; and
   operating an autonomous device based on the one or more inferred intrinsic properties of the one or more objects.

2. The method of claim 1, further comprising:
   linking one or more common objects of the one or more identified objects throughout the video set based on the one or more static properties.

3. The method of claim 1, further comprising:
   identifying a video as belonging to the video set based on identifying an object appearing in the video and the video set as a common object.

4. The method of claim 1, further comprising:
   aggregating the inferred intrinsic properties of the one or more objects for the videos comprising the video set to improve an inference accuracy of the property-based graph neural network.

5. The method of claim 1, operating the autonomous device to move an object to create an interaction between at least two objects within a video of the video set.

6. A computer system for identifying one or more intrinsic physical properties of one or more objects, the computer system comprising:
   one or more processors, one or more computer-readable storage medium, and program instructions stored on the one or more computer-readable storage medium for execution by at least one of the one or more processors via the one or more computer-readable storage medium, wherein the computer system is capable of performing a method comprising:
   identifying one or more objects in a video set;
   extracting observable physical properties of the identified one or more objects from the video set, including one or more trajectories;
   inferring, by a property-based graph neural network, intrinsic properties of the one or more objects based on the trajectories;
   representing the intrinsic properties of all identified objects in the video set as a graph comprising nodes and edges, wherein each node represents an identified object of the one or more identified objects and each edge represents a charge between two connected objects; and
   operating an autonomous device based on the one or more inferred intrinsic properties of the one or more objects.

7. The computer system of claim 6, wherein the method further comprises:
   linking one or more common objects of the one or more identified objects throughout the video set based on the one or more static properties.

8. The computer system of claim 6, wherein the method further comprises:
   identifying a video as belonging to the video set based on identifying an object appearing in the video and the video set as a common object.

9. The computer system of claim 6, wherein the method further comprises:
   aggregating the inferred intrinsic properties of the one or more objects for the videos comprising the video set to improve an inference accuracy of the property-based graph neural network.

10. The computer system of claim 6, wherein the method further comprises:
    operating the autonomous device to move an object to create an interaction between at least two objects within a video of the video set.

11. A computer program product for identifying one or more intrinsic physical properties of one or more objects, the computer program product comprising:
- one or more computer-readable storage medium and program instructions stored on at least one of the one or more computer-readable storage medium, the program instructions executable by a processor to cause the processor to perform a method comprising:
- identifying one or more objects in a video set; extracting observable physical properties of the identified one or more objects from the video set, including one or more trajectories; and
- inferring, by a property-based graph neural network, intrinsic properties of the one or more objects based on the trajectories;
- representing the intrinsic properties of all identified objects in the video set as a graph comprising nodes and edges, wherein each node represents an identified object of the one or more identified objects and each edge represents a charge between two connected objects; and
- operating an autonomous device based on the one or more inferred intrinsic properties of the one or more objects.

12. The computer program product of claim 11, wherein the method furcher comprises:
- linking one or more common objects of the one or more identified objects throughout the video set based on the one or more static properties.

13. The computer program product of claim 11, wherein the method furcher comprises: identifying a video as belonging to the video set based on identifying an object appearing in the video and the video set as a common object.

14. The computer program product of claim 11, wherein the method furcher comprises:
- aggregating the inferred intrinsic properties of the one or more objects for the videos comprising the video set to improve an inference accuracy of the property-based graph neural network.

15. The computer program product of claim 11, wherein the method further comprises operating the autonomous device to move an object to create an interaction between at least two objects within a video of the video set.

* * * * *